(No Model.)
E. HAYDEN.
FLY GATE FOR ATTACHMENT TO SCREENS, &c.
No. 524,437.     Patented Aug. 14, 1894.
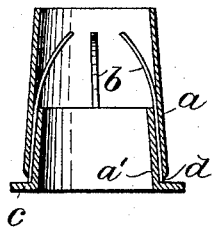
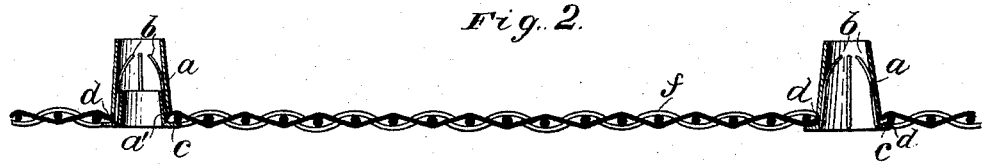
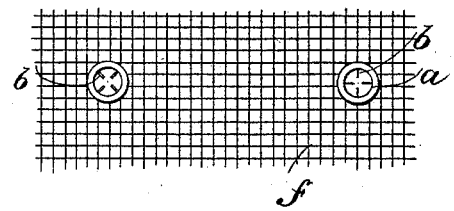
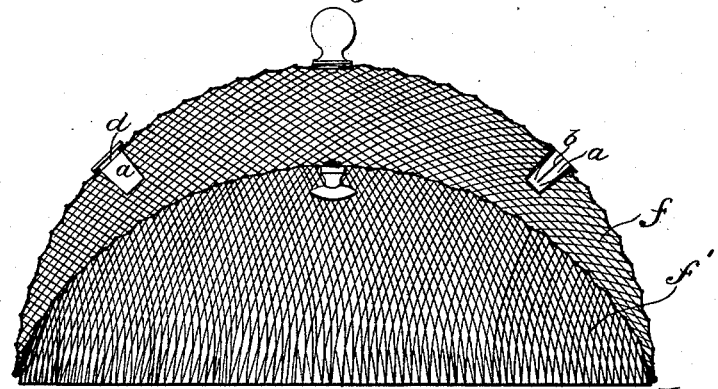
Witnesses
W. R. Edelen.
Inventor,
Everett Hayden
by John␣Mauro
his attorneys

UNITED STATES PATENT OFFICE.

EVERETT HAYDEN, OF WASHINGTON, DISTRICT OF COLUMBIA.

FLY-GATE FOR ATTACHMENT TO SCREENS, &c.

SPECIFICATION forming part of Letters Patent No. 524,437, dated August 14, 1894.

Application filed May 26, 1894. Serial No. 512,584. (No model.)

*To all whom it may concern:*

Be it known that I, EVERETT HAYDEN, a citizen of the United States, and a resident of Washington, in the District of Columbia, have invented a new and useful Improvement in Fly-Gates for Attachment to Screens and other Articles, which improvement is fully set forth in the following specification.

This invention has reference to a gate or device applicable principally to fly-screens for doors and windows (though susceptible of other useful applications) and which permits the free passage of flies or other insects in one direction through the screen or wall to which it is applied, but preventing their return or passage in the opposite direction.

The device or gate consists essentially of a small tube of metal or other suitable material, herein termed the thimble, preferably in the form of a frustum of a cone, provided with a series of bristles, filaments or fine wires, fixed at one end to the interior of the thimble near its base, and at their free ends converging toward the middle of the other end of the thimble. These filaments are sufficiently yielding or are far enough apart at their free ends to oppose no obstacle to the passage of the fly or insect from the base toward the mouth of the thimble, but oppose an impassable obstacle to its return, in the opposite direction, since the presence of the thimble surrounding the filaments compels the insect to meet the sharp ends of the latter.

It is a matter of common observation that at certain times of the day the flies in an apartment will congregate upon the inside of the screens and walk over the wire-mesh seeking to escape. At such times the screens defeat the purpose for which they are designed. By inserting at convenient places in the screens a number of these gates with the free ends of the bristles or filaments pointing outward, the insects will avail themselves of the means thus afforded to pass through the screen.

The gate may, of course, be applied to panels, shutters, window panes, or other surfaces, or put to boxes or inclosures of any sort which may thus serve as an insect trap, and can be quickly put in place by inserting it in an opening of proper size, the tapering form of the thimble facilitating this application. I also contemplate its application to wire dish-covers as will be hereinafter pointed out.

The size, material employed and other matters of detail may be varied according to the intended use. For application to fly-screens the thimble should be from about one-fourth of an inch to three-eighths of an inch long, and have an interior diameter at the small end of about three-sixteenths of an inch.

Referring to the accompanying drawings which form part of this specification, Figure 1, is a vertical section on an enlarged scale of an insect-gate constructed according to the invention. Fig. 2 is a sectional view of the same applied to a wire screen. Fig. 3 is an elevation of the inside of a portion of a screen, and Fig. 4 illustrates the application of the invention to a wire dish-cover.

The thimble may be made in many different ways and of different materials. As shown in Fig. 1 it is composed of two tubes $a$, $a'$, having the ends of the filaments $b$ clamped between them, this being a simple mode of constructing the device. The thimble at the right hand end of Fig. 2 is composed of a single piece $a$, the filaments $b$ being soldered or otherwise secured to the interior wall thereof near the base. The thimble is preferably formed with a flange $c$ at its base, and also with an annular groove $d$ (Fig. 1) for convenience in securing the device in a web $f$ of wire-gauze or other material.

In Fig. 4 I have shown the gate applied to wire dish-covers used to protect edibles, the cover being in this case composed of two screens or sheets of wire gauze $f\,f'$. The thimble is applied to the outer sheet with its mouth pointing inward. The contents of the dish will in this case serve as a bait to attract the flies, who will be trapped between the two sheets $f\,f'$ and can be drowned or otherwise disposed of. The inner sheet $f'$ is removable.

It is not necessary to describe other applications of the invention, which will readily suggest themselves.

The gates can be sold as articles of manufacture complete in themselves to be applied to any purpose for which they may be useful.

Having now fully described my said invention, what I claim is—

1. The combination with a sheet or web of wire-cloth or other material impassable to flies and other insects, of a gate inserted in said sheet or web and composed of a thimble surrounding a series of filaments fixed at one end to the inner wall of the thimble, and converging at their free ends, substantially as described.

2. The combination with a fly-screen, of a gate for permitting flies or other insects to pass through the screen in one direction only, said gate being composed of a thimble or tube surrounding a series of filaments fixed at one end to the tube or thimble and converging at their free ends, substantially as described.

3. The described gate or device for permitting flies or other insects to pass freely in one direction only, said gate or device being composed of a thimble surrounding a series of filaments fixed at one end to the inner wall of the thimble, and converging at their free ends, substantially as described.

4. The combination of the thimble of tapering form provided with a flange at its base, and the filaments fixed at one end to the inner wall of the thimble and converging at their free ends toward its mouth, substantially as described.

In testimony whereof I have signed this specification in the presence of two subscribing witnesses.

EVERETT HAYDEN.

Witnesses:
PHILIP MAURO,
REEVE LEWIS.